(12) United States Patent
Kerisit

(10) Patent No.: US 7,664,722 B2
(45) Date of Patent: Feb. 16, 2010

(54) DATA ANALYSIS TO OPTIMIZE AN EXPLICATIVE RULE FOR ANALYZING THE OPERATION OF A PRODUCTION LINE

(75) Inventor: Jean-Marc Kerisit, Paris (FR)

(73) Assignee: Intercim, Paris (FR)

( * ) Notice: Subject to any disclaimer, the term of this patent is extended or adjusted under 35 U.S.C. 154(b) by 317 days.

(21) Appl. No.: 10/912,346

(22) Filed: Aug. 5, 2004

(65) Prior Publication Data

US 2006/0053412 A1 Mar. 9, 2006

(51) Int. Cl.
*G06N 7/00* (2006.01)
(52) U.S. Cl. .............................. 706/59; 706/45; 706/47
(58) Field of Classification Search ................... 706/59, 706/45, 47
See application file for complete search history.

(56) References Cited

U.S. PATENT DOCUMENTS

| | | | | |
|---|---|---|---|---|
| 4,495,559 A * | 1/1985 | Gelatt et al. | ................... | 700/28 |
| 5,329,612 A * | 7/1994 | Kakazu et al. | ................ | 706/59 |
| 5,819,255 A * | 10/1998 | Celis et al. | ...................... | 707/2 |
| 6,321,217 B1 * | 11/2001 | Maeda et al. | ................. | 706/47 |
| 6,567,802 B1 * | 5/2003 | Popa et al. | ...................... | 707/3 |
| 6,697,791 B2 * | 2/2004 | Hellerstein et al. | ............ | 706/47 |
| 6,850,933 B2 * | 2/2005 | Larson et al. | ................... | 707/4 |
| 6,868,413 B1 * | 3/2005 | Grindrod et al. | .............. | 706/59 |

OTHER PUBLICATIONS

"Some advantages of stochastic methods in multicriteria optimization of multibody systems", P. Eberhard, W. Schiehlen, D. Bestle, Archive of Applied Mechanics 69, 1999, pp. 543-554.*
Kenneth De Jong, "Learning with Genetic Algorithms: An Overview", Machine Learning 3: 1988, pp. 121-138.
Kenneth A. De Jong and William M. Spears, "Learning Concept Classification Rules Using Genetic Algorithms", 1991.
John H. Holland, "Escaping Brittleness: The Possibilities of General-Purpose Learning Algorithms Applied to Parallel Rule-Based Systems"; 1986 pp. 593-623.
Kenneth De Jong, "Learning with Genetic Algorithms: An Overview", Machine Learning 3: 1988, pp. 121-138.
Kenneth A. De Jong and William M. Spears, "Learning Concept Classification Rules Using Genetic Algorithms", 1991, pp. 1-6.
Alex A. Freitas, "A Survey of Evolutionary Algorithms for Data Mining and Knowledge Discovery", 2003, pp. 819-841.

* cited by examiner

*Primary Examiner*—David R Vincent
*Assistant Examiner*—Mai T Tran
(74) *Attorney, Agent, or Firm*—Oblon, Spivak, McClelland, Maier & Neustadt, L.L.P.

(57) ABSTRACT

A method for optimizing an explicative rule including constructing an explicative rule including at least one logical combination of at least one elementary conclusion, each elementary conclusion including a restriction of the domain of a variable; calculating at least one modified explicative rule optimizing the value of one or more quality indicators on a database of examples; and displaying a representation of the rules and corresponding quality indicators.

15 Claims, 5 Drawing Sheets

Selection panel for optimization criteria and constraints

Operating diagram of step 2 of the algorithm

Display panel of the optimization results

Principal application: display of rule selected at outcome of the optimization in the list of existing rules

DATA ANALYSIS TO OPTIMIZE AN EXPLICATIVE RULE FOR ANALYZING THE OPERATION OF A PRODUCTION LINE

FIELD OF THE INVENTION

This invention pertains to the field of data analysis for the establishment of an explicative rule.

BACKGROUND

Known in the state of the art are solutions for the construction from a set of data of rule-based explicative models. These methods are designed to determine the set of the best rules, i.e., the set of rules that collectively maximize certain quality criteria. A number of these solutions are based on stochastic optimization techniques (in which one searches for rules maximizing the quality by an alternation of random and deterministic displacements in the space of the possible rules) such as, e.g., genetic algorithms. The following publications can be cited as representative of this approach.

For a general introduction to the application of stochastic optimization to the construction of sets of rules:

A. A. Frietas (2003). A Survey of Evolutionary Algorithms for Data Mining and Knowledge Discovery. Advances in evolutionary computing: theory and applications, A. Ghosh and S. Tsutsui (eds.), pp. 819-845, Springer.

The representation of a rule by an individual of the population of a genetic algorithm was proposed by:

J. H. Holland (1986). Escape brittleness: the possibilities of general-purpose learning algorithms applied to rule-based systems. Machine Learning: an AI Approach, volume 3, R. S. Michalski, T. M. Mitchell, J. G. Carbonell and Y. Kodratoff (eds.), pp. 593-623, Morgan Kaufmann.

Other publications expanded this approach:

K. De Jong (1988). Learning with Genetic Algorithms: An overview. Machine Learning 3, pp. 121-138.

K. De Jong and W. M. Spears (1991). Learning, concept classification rules using genetic algorithms, Proceedings of the $12^{th}$ International Joint Conference on Artificial intelligence, K. Mylopoulos and R. Reiter (eds.), pp. 651-656, Morgan Kaufman.

The problem posed by these solutions is twofold: on the one hand, these solutions are intended to calculate a model constituted of a set of rules and are not suitable for the development of a single rule and on the other hand the user cannot confront the result of the algorithmic processing with the user's own expertise. More precisely, the user cannot interact with the rule development process which results from an automatic processing not taking into account the user's empirical postulates.

SUMMARY OF THE INVENTION

This invention relates to a method for optimizing an explicative rule including constructing an explicative rule including at least one logical combination of at least one elementary conclusion, each elementary conclusion including a restriction of the domain of a variable; calculating at least one modified explicative rule optimizing the value of one or more quality indicators on a database of examples; and displaying a representation of the rules and corresponding quality indicators.

BRIEF DESCRIPTION OF THE DRAWINGS

Better understanding of the invention will be obtained from the description below referring to a nonlimitative example of implementation in which.

DETAILED DESCRIPTION

Figure 1:
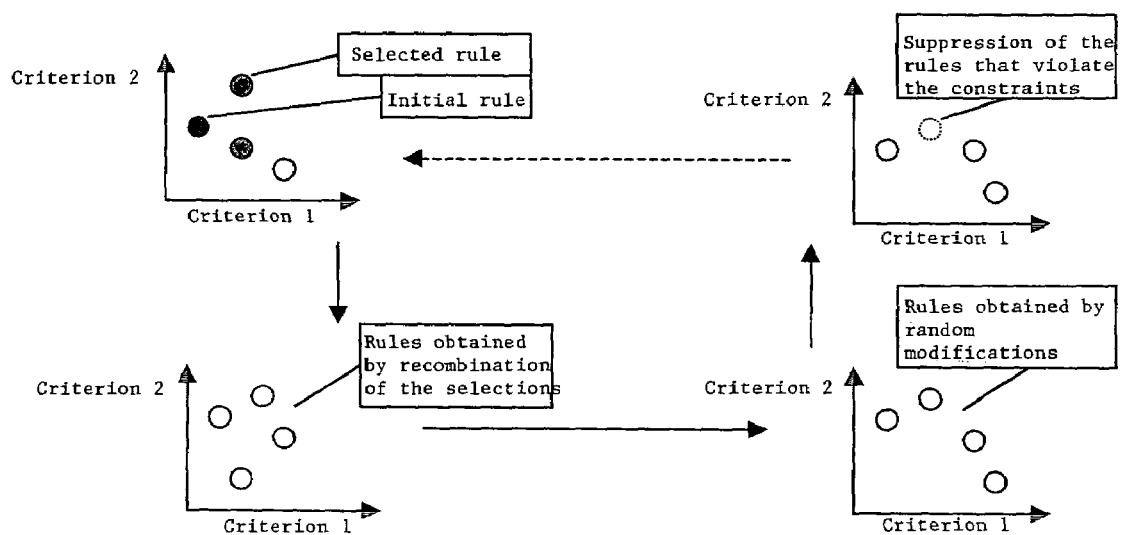
FIG. 1 represents a schematic view of the algorithmic core (step 2 of the calculation module of the optimized rules)

It will be appreciated that the following description is intended to refer to specific embodiments of the invention selected for illustration in the drawings and is not % intended to define or limit the invention, other than in the appended claims.

A principal distinction between the method of this invention and the prior approaches is that this method makes it possible to modify an existing rule in order to improve its quality rather than to construct simultaneously an entire set of rules which are collectively of good quality. Thus, this method makes it possible to take into account when applicable knowledge, resulting from the user's expertise or previously elaborated, encoded in the premises of the initial rule:

by limiting on the one hand the search for the rules which are similar to this initial rule, and on the other hand by taking into account the limitative constraints pertaining to the changes to be brought to this rule.

This invention resolves the drawback presented above by providing a method for the optimization of an explicative rule comprising:

a step of construction of an explicative rule comprising at least one logical combination of at least one elementary conclusion, each elementary conclusion consisting of a restriction of the domain of a variable, a step consisting of calculating at least one modified explicative rule optimizing the value of one or more quality indicators on a data source called database of examples and of displaying a representation of said rules and the corresponding quality indicators.

The explicative rule preferably moreover comprises at least one elementary premise consisting of a restriction of the domain of a variable.

According to one particular implementation, the calculation of the modified explicative rules also minimizes the distance the initial rule.

According to a variant, the method furthermore comprises a step consisting of selecting from among a set of quality indicators the quality indicator(s) of the rule the value of which must be optimized.

According to a variant, the explicative rule comprises a logical combination of elementary premises, each elementary premise consisting of a restriction of the domain of a variable.

According to particular variants, one of the quality indicators is:

a rule size indicator: characterizes the number of examples of the database of examples which verify the premises of the rule, a rule volume indicator: characterizes the volume of the support subspace of the rule, a rule purity indicator: characterizes the proportion among the examples which verify the premises of the rule of those which also verify its conclusions, a rule sensitivity indicator: characterizes the resistance of the rule to changes, a robustness indicator: characterizes the nonrandom character of the rule.

According to another variant, the method comprises a step of graphical representation of the optimized rules and of the corresponding quality indicators.

The method advantageously comprises an additional step of visualization of a graphical representation of the result of the application of the optimized rule to the database of examples.

According to a particular mode of implementation, the step of determination of the objectives comprises the determination of the thresholds of the values of the quality indicators.

According to another mode of implementation, the method comprises a step of selection and invariance of a part of the elementary premises of the initial rule.

The described system is articulated around a software program architecture composed of:
  a module of selection of a database of examples,
  a module of construction of an initial explicative rule,
  a module of specification of the objective of the optimization,
  a module of calculation of optimized rules,
  a module of visualization of the proposed rules.

Figure 5:
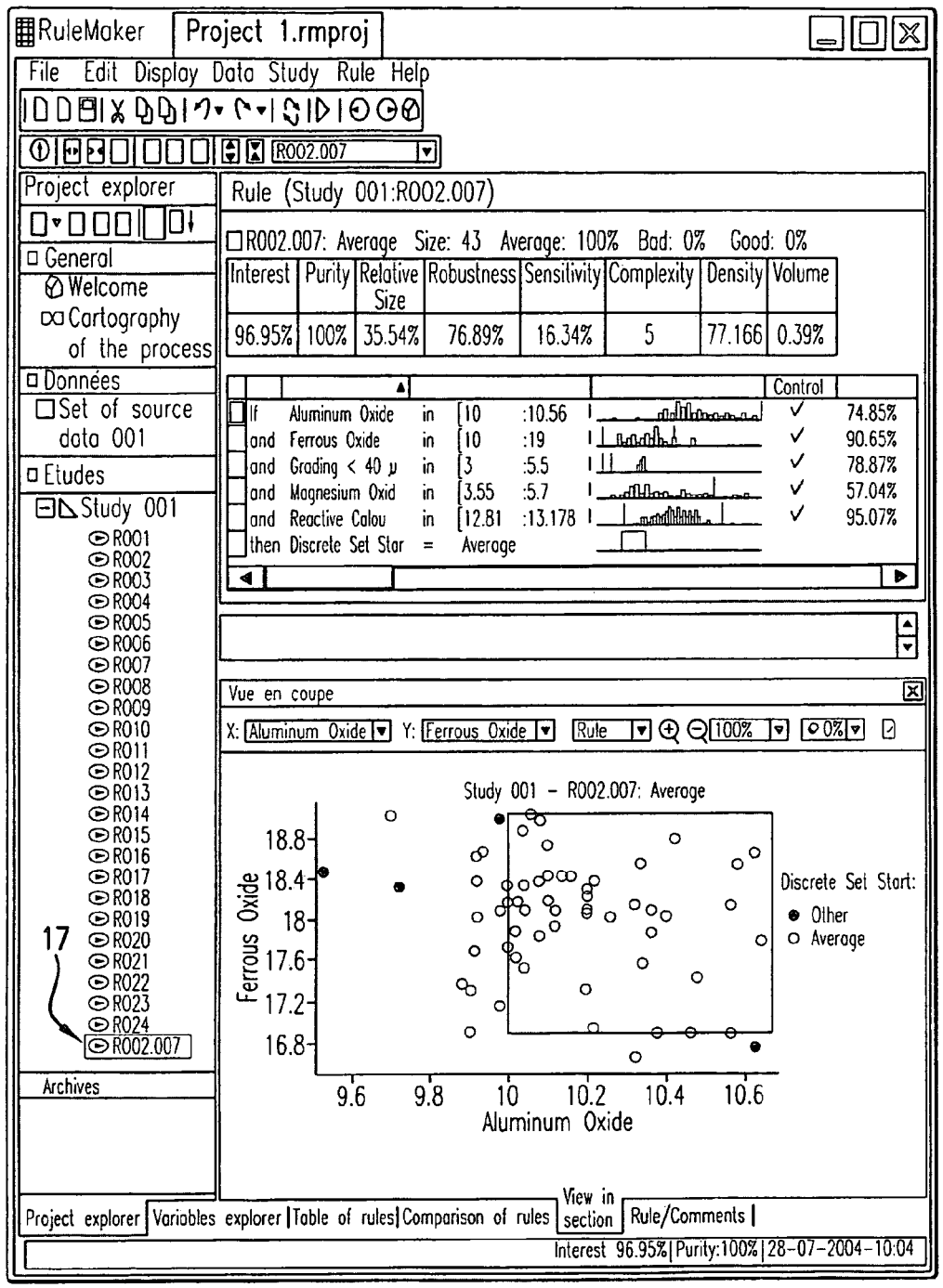
FIG. 5 represents a view of the display interface of the rule selected at the outcome of the optimization in the list of existing rules.

The graphics of FIGS. 2 to 5 illustrate the operation of the suggested implementation:

The initial rule is selected from a list or constructed by the user using, e.g., the graphical interface of FIG. 5.

Figure 2:
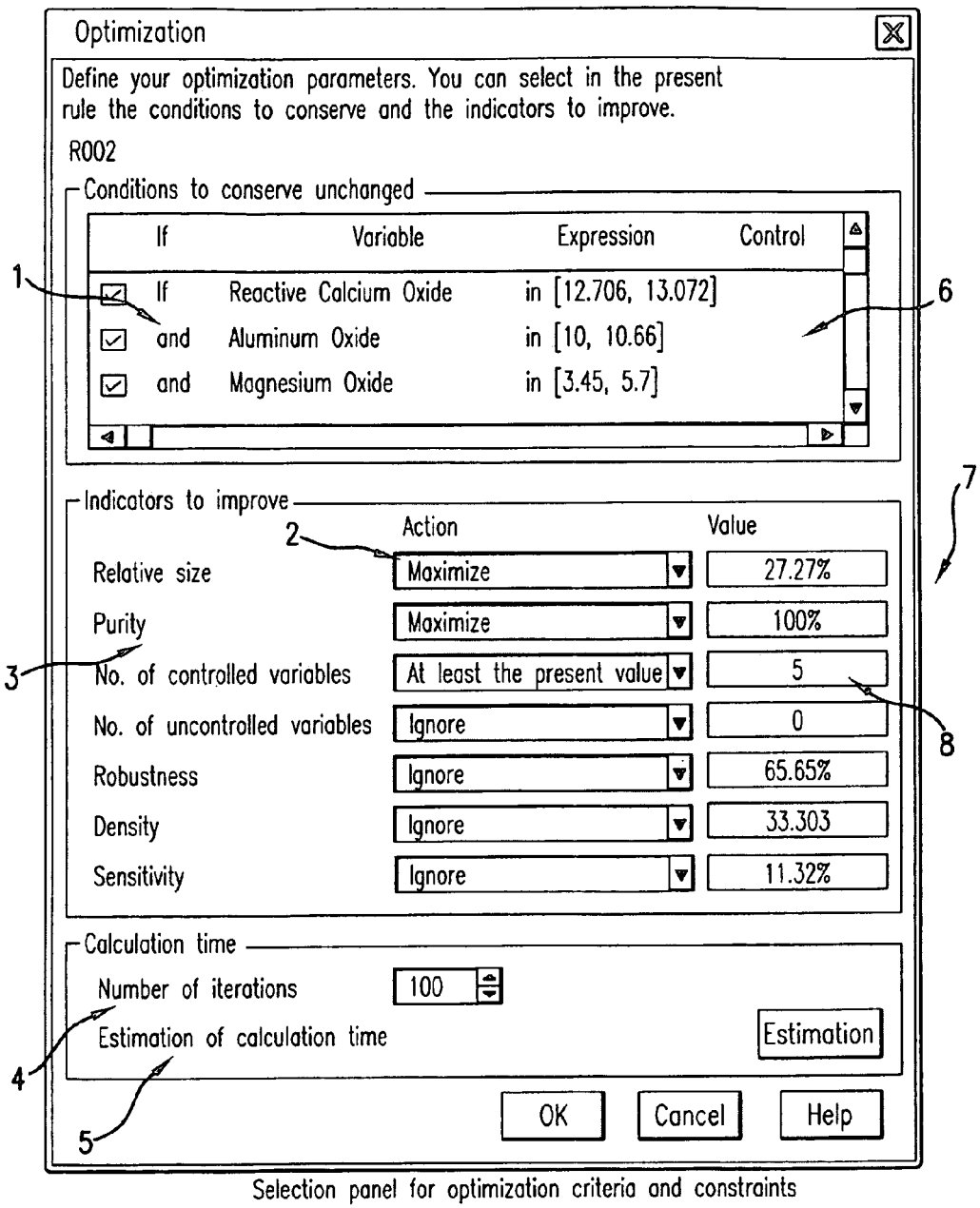
FIG. 2 represents a view of the interface for selection of the criteria and constraints of the optimization.

The graphical interface of FIG. 2 then makes it possible to specify the objectives of the optimization. The first frame ((1), (6)) indicates the premises of the initial rule and allows selection (by checking off the boxes (1)) of the premises which should not vary. The second frame ((2), (3), (7), (8)) allows the user to indicate, for each of the indicators made explicit above, what the optimization behavior should be: maximize, minimize or ignore the indicator (2) or force the indicator to have at least (8) or at most the value that it has for the initial rule (displayed as in (7)). The last frame ((4), (5)) indicates the number of iterations (4) that the algorithm will implement and gives an indication (5) of the required calculation time.

Figure 3:
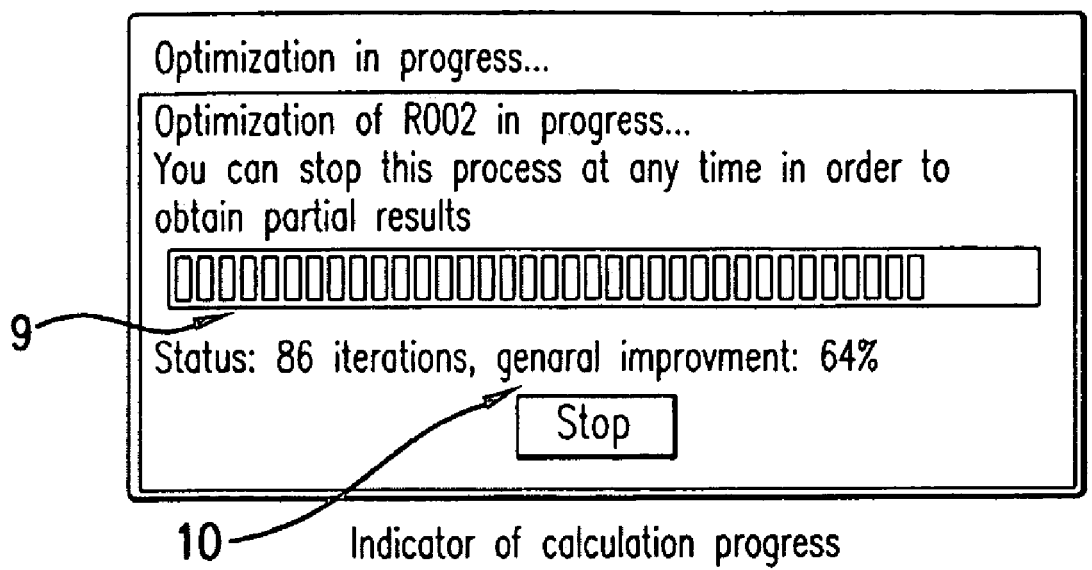
FIG. 3 represents a view of the monitoring interface of the progression of the calculations.

FIG. 3 represents an evolution indicator of the calculation which is presented to the user during the operation of the optimization algorithm.

Figure 4:
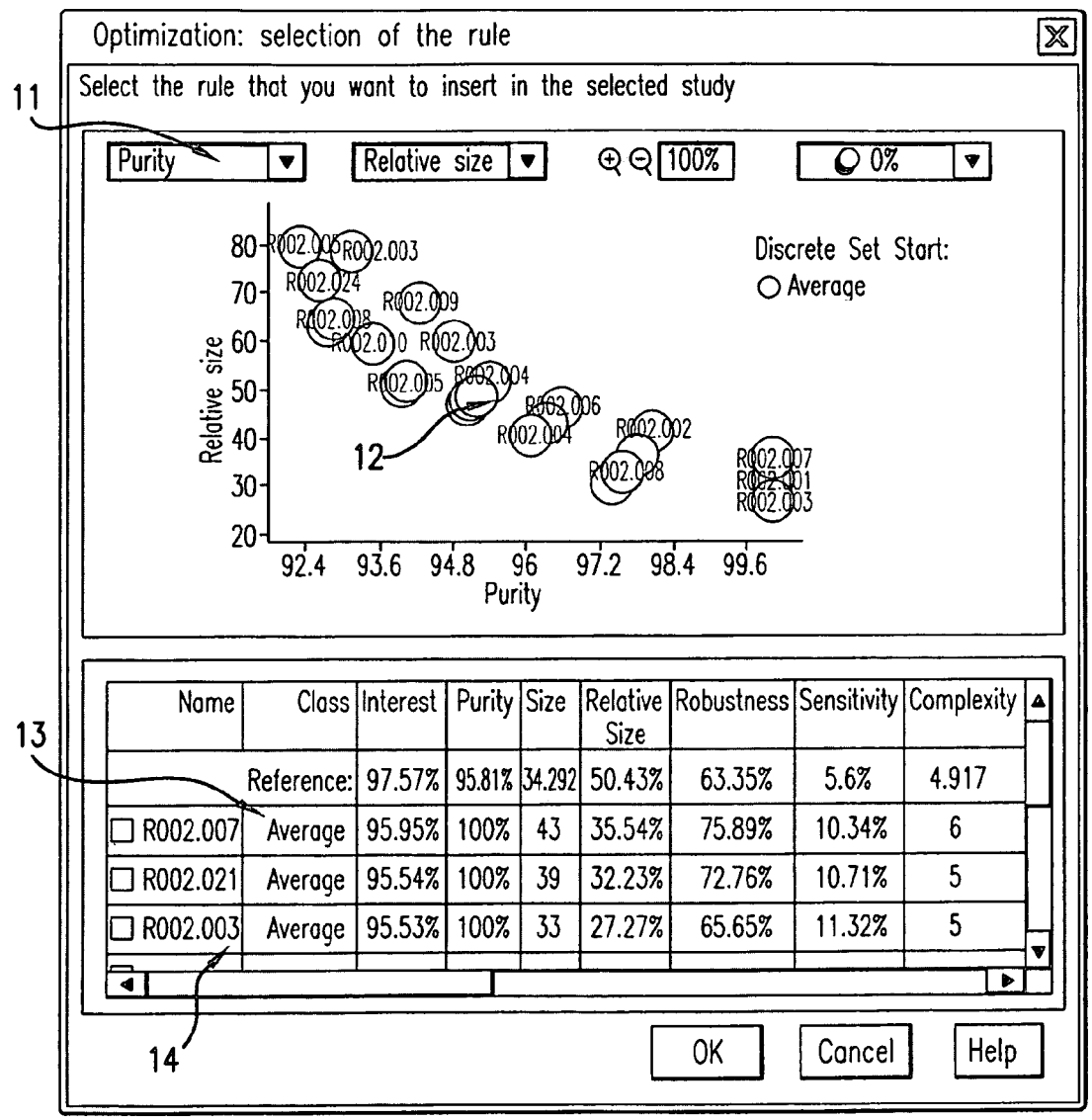
FIG. 4 represents a view of the display interface of the results of the optimization.

FIG. 4 presents in graphical form the results of the optimization. The graph ((11), (12)) provides a representation, in the plane of purity and size indicators, of the rules obtained by the optimization. The user can select any pair (11) of indicators for this representation. A list in table form (13) of the rules with their indicators and their premises and conclusions, is also provided. The boxes to be checked off (14) allow selection of the rule(s) retained which is (are) then added to the list (17) of the principal application (FIG. 5).

Module of Selection of a Database of Examples

In order to construct an explicative rule according to the invention, the first step constitutes collecting the experimental data for constituting a database of examples in the form of a table in which each line is an example and each column is a variable.

To illustrate this, in the case of an implementation intended to analyze the operation of a production line, each example corresponds to a production batch for which the values of adjustment variables (controllable variables) or variables acquired (subjected, variables, also called "uncontrollable" variables) by a sensor are recorded as well as a production quality variable (conforming production or nonconforming production).

This database of examples can be directly loaded from a file or database or be selected from within an existing analysis project, or defined as derived from an existing database by operations such as: filtering, addition of new calculated variables, etc.

Module of Construction of an Initial Explicative Rule

This module makes it possible to select or to construct the rule to be optimized.

The invention enables the construction of one or more rules implicating the different variables to enable better comprehension of the link among the variations of the values of the variables and the quality of the production.

The invention consists of selecting a particular rule. This rule can result from a prior learning process or a statistical processing of the database of examples, or from an intuitive formulation by an operator or an expert. It comprises at minimum a conclusion pertaining to a variable and a modality for this variable.

This rule can be recorded in a project. It is presented in the form of a logical equation among certain variables.

It is possible to calculate for this rule quality indicators describing the pertinence of the rule when it is applied to real examples.

In order to describe these indicators it is useful to introduce several terms. An example is referred to as "covered" by a rule if it satisfies all of the premises of the rule (in particular, a rule without premise covers all of the examples). It is said of an example that it is "correctly ranked" by a rule if it satisfies all of the conclusions of the rule and that it is "incorrectly ranked" in the opposite case. The "ranking" of a rule refers to the set of examples "correctly ranked" by the rule.

The following will be employed below in the context of the database of examples and a rule:

N, the number of examples of the database which are in the ranking of the rule, n, the number of examples covered by the rule and correctly ranked, k, the number of examples covered by the rule and incorrectly ranked, K, the number of examples of the database which are not in the ranking of the rule.

The calculated indicators can in particular be selected from among the following indicators:

Size

The size indicator is the number of examples in the database covered by the rule:

$$I_{Size} = n + k$$

Relative Size

The relative size is an indicator which takes into Account the conclusion of the rule. It is calculated as follows:

number of examples which satisfy the premises and the conclusions of the rule/number of examples which satisfy the conclusions of the rule:

$$I_{RelativeSize} = \frac{n}{N}$$

Purity

The degree of purity of a rule is determined by the ratio of the number of examples covered by the rule and correctly ranked to the total number of examples covered by the rule.

For example, if a rule concluding on the value "good" for the output variable contains 5 points (examples) of which 4 have as value the output variable of the value "good" and 1 point the value "bad", the purity of the rule is 4/5 or 80%.

$$I_{Purity} = \frac{n}{n+k}$$

Complexity

Complexity is the number of variables implicated in the premises of the rule.

Number of Controlled Variables

This indicator is defined as the number of controlled variables implicated in the premises of the rule.

Number of Uncontrolled Variables

This indicator is defined as the number of uncontrolled variables implicated in the premises of the rule.

Robustness

The robustness of a rule is a statistical indicator taking into account the probability according to which this rule could be the result due to pure chance. In order to calculate this indicator, one uses the following number which determines the probability (under the hypergeometric law) of obtaining a rule which has the same relative size (assuming all of the equiprobable combinations) among those which have the same size:

$$hg(R) = \frac{C_N^n \times C_K^k}{C_{N+K}^{n+k}}$$

There is then performed a random drawing of rules (by drawing pairs of points and calculating from them the least general rule that covers these points) which one ranks by decreasing hypergeometric probability hg(R).

Among these, one determines a rule such that 10% of the rules have a weaker probability which is called "T".

One then calculates the following function which has the value ½ when the rule R has the same hypergeometric probability as the rule T:

$$F(R) = 1 - \frac{1}{2^{\log(hg(R))/\log(hg(T))}}$$

This function is close to the robustness indicator. It is sufficient to correct its value when the purity of the rule R is lower than that of the database (calculated as the ratio N/+K):

$$I_{robustness}(R) = \begin{cases} F(R), & \text{if } I_{purity}(R) > \frac{N}{N+K} \\ 2 \times F(R_0) - F(R) & \text{if not} \end{cases}$$

in which $R_0$ is an (arbitrary) rule of the same size as R and of purity N/N+K.

Relative Volume

The relative volume of the rule is calculated as the product of the relative volumes of the domains of each premise. The relative volume of a premise is understood to mean the ratio of the measure of the space of variation of the implicated variable after restriction to the measurement of the total space of variation of this variable.

Thus, if a variable V1 can take any real values between 0 and 3 in all of the database, the relative volume of a premise of the type "VI between 1 and 2" is ⅓ because the volume of the restriction interval is 1(=2−1) and the volume of the total interval of variation is 3(=3−0). Similarly, if a variable V2 can take 2 values in all of the database: {Good, Bad}, the relative volume of a premise Of the type "V2=Good" is ½ because the volume of the restriction interval is 1 (a single value) and the volume of the total interval of variation is 2 (2 possible values). In this hypothesis, the relative volume of a rule of the type "If V1 between 1 and 2 and V2=Good, Then . . . " has the value: ⅓·½=⅙.

Density

The density of a rule is calculated as the ratio of the normalized size (size l number of examples in the database) to its relative volume. In the particular case in which the volume is zero, the density has the volume of 1.

$$I_{Density} = \frac{I_{size}}{(N+K) \cdot I_{RelativeVolume}}$$

Sensitivity

The sensitivity is determined by the following method:

The sensitivity of a premise is obtained by measuring the difference in purity, after perturbation, i.e., augmentation of the bounds of the variable by 10% (5% to the left and 5% to the right), The sensitivity of a rule is obtained by taking the maximum of the sensitivities of the premises that it contains.

Interest

The interest is a composite indicator which is calculated as a product of linear combinations of indicators among the preceding indicators, the exact form (i.e., the weight assigned to each individual indicator) is determined by the choices made by the user during the definition of the objectives of the study.

In the example of implementation, a rule is defined precisely by:

a conjunction of elementary premises, each elementary premise consisting of a restriction of the domain of a variable:
in the form of an interval of variation for an ordered variable,
in the form of a particular value for a non-ordered variable,
and a elementary conclusion also consisting of a restriction of the domain of a variable, said variable being discrete (not ordered).

Module of Specification of the Objective of the Optimization

This module makes it possible to specify the constraints (invariance of premises, minimal or maximal values for the indicators) and objectives (maximization, minimization or ignorance) of each of the previously cited indicators.

For the selected rule, there will be visualized a graphical representation comprising, for each elementary premise, the nature of the variable as well as the window of restriction of applied values and the logical operator combining these premises with the other premises. In a simplified solution, the operator for each selected premise is of type "and". The rule of type "if condition 1 and condition 2 . . . then Result". It is possible to select an elementary premise by an action in a box to be checked off. This selection will impose the invariance of this premise.

There are also displayed the indicators of quality and their corresponding values for the rule calculated on the database of examples. In order to facilitate the exploitation of this information, the value of the indicator will be associated with a color marker indicating the quality level of the corresponding indicator.

The user is able to impose constraints on all or part of the indicators or to select all or part of the indicators to be optimized:

For example, the user can impose a threshold value on an indicator or designate an indicator to be maximized or minimized. The threshold corresponds in the described example to the current value of the indicator for the initial rule. The user can chose to set this value as upper threshold or lower threshold.

The user can also ignore certain indicators on which no constraint will be applied in the continuation of the processing.

Module for Calculating Optimized Rules

This module performs a search by multiobjective genetic algorithm with constraints of a set of optimal rules for the criteria specified by the user, similar to the rule initially selected and respecting the specified constraints.

The proposed example of implementation uses a variant of the algorithms investigated by:

N. Srinivas and K. Deb (1993). Multiobjective optimization using nondominated sorting in genetic algorithm. Technical report, Department of Mechanical Engineering, Indian Institute of Technology, Kanput, India.

C. Fonesca and P. Fleming (1993). Genetic Algorithm for Multiobjective Optimization: Formulation, Discussion and Generalization. Proceedings of the Fifth International Conference on Genetic Algorithms, S. Forrest (ed.), pp. 416-423, San Mateo, Calif.

C. A. Coelle Coello (1999). A Comprehensive Survey of Evolutionary-Based Multiobjective Optimization Techniques. Knowledge and Information Systems, Vol. 1, No. 3, pp. 269-308.

The implementation is iterative and consists of the repetition of an algorithmic body which, given a set of candidate rules, consists of effecting elementary operations of modification on these rules, evaluating their quality in relation to different criteria and constraints, and selecting the most satisfactory.

One of the particularities of the proposed implementation is the maintenance of two populations (or sets of rules). One population enabling the processing and random searching, and the other serving to store in memory the best rules (elite population) to prevent the previously found interesting rules from being lost during the progression of the algorithm.

Management of the constraints is performed in a dynamic manner, releasing them at the beginning of the algorithm and progressively augmenting their restrictive effect (see substep 2.8).

Step 1: Initialization

Prior to the execution of the body of the algorithm, it is necessary to initialize its different elements.

Initialization of the constraints at a minimal value, the initial level of satisfaction of the constraint is set at a value $C=0.75$ and one uses constraints of the form:

For the constraint of similarity to the initial rule (added automatically and not specified by the user): $I_{similarity}(R) > C.similarityThreshold$, For the constraints of minimal or maximal value (specified by the user): $I(R) > C.I(R_0)$ in which $R_0$ is the initial rule.

Initialization of a population of individuals, each individual being a rule close to the rule to be optimized (the variants are obtained by applications of random local mutations as in substep 2.4).

Step 2: Stochastic Search

The overall operation of this step is represented in FIG. 1.

Substep 2.1: Evaluation of Each Individual of the Population

This evaluation consists of the calculation of the quality indicators and their transformation into values which are sufficiently large to satisfy the desires of the user.

In addition to the quality indicators, an indicator of similarity to the initial rule is calculated (see the definition above), as well as a sharing indicator (called SharingFitness which indicates whether the rules of the population are sufficiently different from each other).

When there is a choice between maximization and minimization, one uses as objective criterion the initial criterion (maximization) or the initial criterion (minimization).

The following value is used as this ranking indicator:

$$I_{domFitness}(R) = \sqrt{1 - \frac{\text{rank}(R)}{\max_i \text{rank}(R_i)}}$$

in which rank(R) is the Pareto's rank of the rule R (number of rules in the population which dominate this rule, i.e., which are strictly superior for at least one indicator).

Finally, the following value is used for calculating the fitness of a rule:

$$I_{Fitness} = \sqrt{(1 - I_{domFitness}(R))(1 - I_{SharingFitness}(R))}$$

A subset of rules is determined by the well known tournament method. These rules will serve to generate new candidates.

Substep 2.3: Pair Crossing of the Rules of the Subpopulation to Form Pairs of New Rules.

For each premise of the rules of the pair, one selects randomly among the reunion of restriction domains the intersection of these domains or the addition of the premise to the daughter rule.

Substep 2.4: Random Mutations of the New Rules

This step consist of randomly applying local modifications to the current rules, such as the reduction or enlargement of the restriction of the domain for a randomly selected premise or the addition or suppression of a premise.

Global modifications are also applied with a lesser frequency. These modifications comprise:

reduction of the rule

Two reductions are applied alternatively:

The rule is replaced by its smaller generalized over all of the modifiable premises; the rule is thereby reduced and completed, The rules is replaced by its smaller generalized over the defined premises: only the defined unconstrained ET premises are modified; the complexity of the rule is thus unchanged.

The two reductions are randomly selected according to a given weighting. For example, when the user wants to have a minimum complexity, it is preferred to have the reduction solely of the defined premises.

Undefinition of the Superfluous Premises

As long as suppression of a premise enables augmentation of the purity, suppression will be implemented (starting with that which causes the greatest augmentation).

Exploration

Two points are added randomly and one or two points are suppressed with a probability of 1/10. The rule is the smaller generalized of the initial rule (minus the suppressed points) and of these points.

Substep 2.5: Addition of the new rules thereby produced in the current population as well as in the elite population.

Substep 2.6: Updating of the elite population: only the undominated rules (which are optimal for at least one criterion) are conserved Substep 2.7: Selection among the current population of a part of the best individuals by a random drawing according to the well known roulette-wheel principle.

Substep 2.8: Updating of the constraints (making them stricter)

The formula used for coefficient C (sec definition of the constraints in step 1) is the following:

$$C = 0.75 + \frac{\text{round}\left(10 * \left(1 - \left(1 - \frac{iter}{\text{max}iter}\right)^5\right)\right)}{10 * 4}$$

Substep 2.9: Updating of the current and elite population. Certain rules which do not respect the constraints are eliminated.

Substep 2.10: If the current population is empty, replace the current population with the elite Step 3: Complementary processing After multiple iterations (number defined in advance by the user) of step 2, the individual optimization processing operations of the rules of the current population are implemented.

For each individual, one searches for a local optimum by testing successively all of the possible mutations. The result of the algorithm is thus a set of candidate rules.

Optional Prediction of the Duration of the Optimization

This operation is performed by estimating the calculation time consumed by substep 2.1 (in launching on a given number of copies of the initial rule) and multiplying by the size of the population and the number of iterations selected.

Parameters used in the example of implementation (CT and ST correspond to two possible strategies)

| Name | Utility | CT | ST |
|---|---|---|---|
| | Global parameters | | |
| populationSize | Size of the current population | 50 | |
| nbParents | Number of parents for the generation of the new individuals | 35 | |
| sharingThreshold | For the calculation of the sharingFitness: $\_\_{share}$ | 0.2 | |
| thresholdSimFit | Minimum resemblance to the initial rule | 20% | |
| thresholdOptimizedFit | Maximal regression on an optimized indicator | 50% | |
| | Probabilities of mutation | | |
| probaGlobalMutation | Probability that the mutation is global | 30% | 30% |
| probaAttributeMutation | Probability that the mutation is by attribute | 70% | 70% |
| | When the mutation is global | | |
| probaPPL | Probability that the mutation is a reduction | 10% | 30% |
| probaLgg | Probability that the mutation is a suppression of premises | 30% | 30% |
| probaExplor | Probability that the memory is the random addition/suppression of points | 10% | 20% |
| Else | No mutation | 60% | 40% |
| | When the mutation is by attribute | | |
| | If the predicate is indefinite | | |
| probabDefineAtt | Probability that the mutation is random definition of predicate | 10% | 10% |
| probaReduceUndefAtt | Probability that the mutation is definition by reduction of the bounds of the predicate | 80% | 30% |
| Else | No mutation | 10% | 60% |
| | If the predicate is defined | | |
| probabUndefineAtt | Probability that the mutation is undefinition of predicate | 10% | 20% |
| probaEnlargeAtt | Probability that the mutation is enlargement of the predicate | 10% | 10% |
| probaReduceDefAtt | Probability that the mutation is reduction of the predicate | 20% | 20% |
| Else | No mutation | 60% | 50% |
| | Probabilities of crossover | | |
| probaCOIntersection | Probability that a predicate of the child is the intersection of the predicates of the 2 parents | 50% | 30% |
| probaCOGeneralize | Probability that a predicate of the child is the union of the predicates of the 2 parents | 10% | 30% |

-continued

| Name | Utility | CT | ST |
|---|---|---|---|
| Else | Probability that the predicate of the child is a copy of the predicate of one of the 2 parents | 40% | 40% |

Module of Visualization of the Suggested Rules

This module enables presentation in graphical form of the rules selected by the algorithm.

The rules are represented in a graphical form on a diagram the axes of which correspond to two quality indicators selected by the user. Each rule is represented by a graphical sign the coordinates of which correspond to the values of the two indicators. This representation allows the user to select one of the optimized rules or more than one among them, corresponding to an optimal compromise in relation to the quality indicators.

For each of the rules represented, the user accesses the values of the corresponding quality indicators in table form.

This table also comprises the matrix of contribution in which each cell corresponds to the restriction of domain of a variable for a given rule.

The invention claimed is:

1. A method implemented by a computer, including a processor that has been programmed with instructions that cause the computer to optimize an explicative rule used for analyzing the operation of a production line, comprising:
   collecting data by the computer to constitute a database of examples in the form of a table in which each line of the table is an example and each column of the table is a variable of the example;
   storing the table in a computer-readable storage medium;
   constructing at least one initial explicative rule relating to the table, the at least one initial explicative rule including at least one logical combination of at least one elementary conclusion, each elementary conclusion including a restriction of the domain of one of the variables;
   calculating values relating to quality indicators describing a pertinence of the initial explicative rule when applied to the examples of the database;
   determining at least one modified explicative rule optimizing a value of the quality indicators of the at least one initial explicative rule; and
   displaying a graphical representation of the at least one modified explicative rule and corresponding quality indicators on a display, wherein the axes of the graphical representation correspond to at least two selected quality indicators.

2. The method according to claim 1, further comprising:
   selecting from among a set of said quality indicators at least one quality indicator of the at least one initial explicative rule the value of which must be optimized.

3. The method according to claim 2, wherein calculation of the at least one modified explicative rule also minimizes the distance to the at least one initial rule.

4. The method according to claim 1, wherein the at least one initial explicative rule further includes at least one elementary premise including a restriction of the domain of a variable.

5. The method according to claim 1, wherein the at least one initial explicative rule includes a logical combination of elementary premises, each elementary premise including a restriction of the domain of a variable.

6. The method according to claim 1, wherein one of the quality indicators is a rule size indicator that characterizes the number of examples of the database of examples that verify premises of the at least one initial explicative rule.

7. The method according to claim 1, wherein one of the quality indicators is a rule volume indicator that characterizes the volume of a support subspace of the at least one initial explicative rule.

8. The method according to claim 1, wherein one of the quality indicators is a rule purity indicator that characterizes a proportion among examples that verify premises of the at least one initial explicative rule of those that also verify its conclusions.

9. The method according to claim 1, wherein one of the quality indicators is a rule sensitivity indicator that characterizes resistance of the at least one initial explicative rule to changes.

10. The method according to claim 1, wherein one of the quality indicators is a robustness indicator that characterizes a nonrandom character of the at least one initial explicative rule.

11. The method according to claim 1, further comprising:
    displaying a graphical representation of the at least one modified explicative rule and corresponding quality indicators.

12. The method according to claim 1, further comprising:
    displaying a graphical representation of the result of application of the at least one modified explicative rule on the database of examples.

13. The method according to claim 1, wherein determining the objectives includes determining thresholds of values of the quality indicators.

14. The method according to claim 1, further comprising:
    selection and invariance of a part of elementary premises of an initial rule.

15. The method according to claim 1, further comprising:
    estimating and presenting to the user the time required for optimization processing.

* * * * *